Patented Sept. 18, 1934

1,974,170

UNITED STATES PATENT OFFICE 1,974,170

METHOD OF REFINING HYDROCARBON OIL

Charles R. Baker, Wood River, Ill., assignor to Standard Oil Company, Whiting, Ind., a corporation of Indiana No Drawing. Application August 7, 1930, Serial No. 473,772

6 Claims. (Cl. 196—39)

The present invention relates to decolorizing hydrocarbon mineral oils, particularly lubricating oils, by means of diatomaceous earths, such as clay, and the like.

The invention is adapted to be employed in connection with processes for decolorizing lubricating oils wherein the oil to be treated is contacted with decolorizing clay, while heated to substantially high temperatures.

One type of such decolorizing processes is described in U. S. patent to Lowery and Lane, No. 1,813,628, issued July 7, 1931, wherein the oil to be treated is admixed with decolorizing clay, the mixture being subjected to heating within a pipe still to effect decolorization of the oil. In another type of such processes, the oil is percolated through a mass or body of clay while heated to the desired temperature. In the latter type of process the oil may be wholly, or partly, in either liquid or vapor phase. It is the practice, in such hot clay contacting processes to first treat the lubricating oil stock with strong sulfuric in the usual manner and then subject the acid treated oil to the hot clay contacting operation, the acid treated oil being sour or neutralized with a suitable caustic, such as sodium carbonate, or the like.

It has been found that if the acid treated oil is subjected to a washing operation with a solution of the preferentially water soluble sulfonic acids (recovered from the sludge formed during sulfuric acid treatment of hydrocarbon mineral oil), or the soap of such acids, before it is subjected to the hot clay contacting operation, that an improved bloom is imparted to the oil and substantially less clay is required to secure a predetermined color of the oil.

To illustrate the practice of the present invention: The oil to be treated by means of the present invention may comprise a 60% Mid-Continent crude bottom which was treated with 60 lbs. per barrel of 89 to 93% sulfuric acid. The sludge formed during the acid treatment was settled and separated from the oil and the preferentially water soluble sulfonic acids were washed from the sludge to form an aqueous solution containing from 5 to 15% of the preferentially water soluble sulfonic acids. The acid treated (sour) oil was then subjected to a washing operation with 3 to 6% by volume of the preferentially water soluble sulfonic acid solution. The oil was then permitted to stand until the sulfonic acid solution stratified and thereby separated from the oil. The washed oil was then subjected to a wash with from 5 to 10% by volume of water to reduce its acidity. The oil is now ready to be subjected to the hot clay contacting operation, and may have an acidity as low as 0.4 mg. of KOH per gram, depending, of course, on the extent it is washed with water.

If desired, the oil may be neutralized after the washing operation by means of a suitable caustic, such as sodium carbonate, but, ordinarily, equally satisfactory, and often superior results are obtained with the sour oil. The slightly sour or neutralized oil, as the case may be, is then subjected to the hot clay contacting operation. While the hot clay treatment may be carried out at any temperature within a rather broad range, say, for example, 200 to 900° F., it is preferred to maintain the oil between 300 and 650° F. when it is percolated through a body or mass of clay, temperatures of between 450 and 600° F. ordinarily being sufficient. When the oil is contacted with clay according to the method described in the aforementioned application of Lowery and Lane, temperatures somewhat higher are found most desirable, for example, between 550 and 900° F. The contacted oil is then subjected to the usual filter-pressing operation to remove entrained solids therefrom.

When the above sulfuric acid treated oil was subjected to clay treatment without being first subjected to a wash with a solution of preferentially water soluble sulfonic acids, 1.52 lbs. Olmstead clay per gallon of oil and .30 lb. of a high grade California clay (Palex) per gallon of oil were required to treat the oil to a ⅜ R color (Tag Robinson colorimeter). When the same oil was treated or washed with the preferentially water soluble sulfonic acids, and was not neutralized, .64 lb. of Olmstead clay per gallon of oil and .14 lb. per gallon of oil of California clay were required to treat the oil to a ⅜ R color (Tag Robinson colorimeter), and when the washed oil was neutralized, .88 lb. of Olmstead clay per gallon of oil and .17 lb. of California clay per gallon of oil were required to treat it to the same color. The clay contacted oil which was preliminarily washed in accordance with the present invention had a superior bloom to that of the clay contacted oil which had not been so washed.

It is to be understood that the preferentially water soluble sulfonic acids produced during the acid treatment of any fraction other than the one being treated may be employed in the novel step of the present invention. Also, the soaps of such sulfonic acids may be employed instead of the acids themselves. The term "preferentially water soluble sulfonic compound" as employed in the accompanying claims is intended to include the soaps of such acids as well as the acids themselves.

Although the present invention has been described in connection with the details of a specific embodiment thereof, it is not intended that such details shall be regarded as limitations upon the scope of the invention, except in so far as they are included in the accompanying claims.

I claim:

1. The method of refining hydrocarbon oils which comprises subjecting the oil to treatment with sulfuric acid, washing the acid treated oil with a preferentially water soluble sulfonic acid formed during sulfuric acid treatment of hydrocarbon mineral oil, and contacting the washed acid-treated oil with decolorizing clay while heated to a substantial temperature.

2. The method of refining hydrocarbon oils which comprises subjecting the oil to treatment with sulfuric acid, washing the acid treated sour oil with preferentially water soluble sulfonic acids formed during sulfuric acid treatment of hydrocarbon mineral oil, and contacting the washed acid-treated oil with decolorizing clay while heated to a substantially elevated temperature.

3. The method of refining hydrocarbon mineral oils which comprises subjecting the oil to treatment with sulfuric acid, washing the acid-treated sour oil with preferentially water soluble sulfonic acid formed during sulfuric acid treatment of hydrocarbon mineral oil, then washing the oil with water and thereafter contacting the washed acid-treated oil with decolorizing clay while heated to a substantially elevated temperature.

4. The method of refining hydrocarbon mineral oils which comprises subjecting the oil to treatment with sulfuric acid, washing the acid-treated sour oil with preferentially water soluble sulfonic acid formed during sulfuric acid treatment of hydrocarbon mineral oil, neutralizing the washed sour oil and thereafter contacting the neutralized washed acid-treated oil with decolorizing clay while heated to a substantially elevated temperature.

5. The method of refining hydrocarbon oils which comprises subjecting the oil to treatment with sulfuric acid, washing the acid-treated sour oil with preferentially water soluble sulfonic acids formed during sulfuric acid treatment of hydrocarbon mineral oil, and contacting the washed acid-treated oil with declorizing clay while heated to a temperature within the range of 450 to 600° F.

6. The method of refining hydrocarbon oils which comprises subjecting the oil to treatment with concentrated sulfuric acid, washing the acid-treated sour oil with preferentially water soluble sulfonic acids formed during sulfuric acid treatment of hydrocarbon mineral oil, and contacting the washed acid-treated oil with decolorizing clay while heated to a substantially elevated temperature.

CHARLES R. BAKER.

CERTIFICATE OF CORRECTION.

Patent No. 1,974,170.                                                                      September 18, 1934.

CHARLES R. BAKER.

It is hereby certified that error appears in the printed specification of the above numbered patent requiring correction as follows: Page 2, line 14, claim 1, for "acid" read compound; and that the said Letters Patent should be read with this correction therein that the same may conform to the record of the case in the Patent Office.

Signed and sealed this 16th day of October, A. D. 1934.

Leslie Frazer (Seal)                                                    Acting Commissioner of Patents.